(12) United States Patent
Yamazaki et al.

(10) Patent No.: US 8,884,845 B2
(45) Date of Patent: Nov. 11, 2014

(54) DISPLAY DEVICE AND TELECOMMUNICATION SYSTEM

(75) Inventors: Shunpei Yamazaki, Tokyo (JP);
Keisuke Miyagawa, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 914 days.

(21) Appl. No.: 10/952,163

(22) Filed: Sep. 29, 2004

(65) Prior Publication Data
US 2005/0088365 A1    Apr. 28, 2005

(30) Foreign Application Priority Data
Oct. 28, 2003  (JP) .................. 2003-366924

(51) Int. Cl.
| | | |
|---|---|---|
| G09G 5/00 | (2006.01) | |
| G02B 27/01 | (2006.01) | |
| G01C 21/36 | (2006.01) | |
| G09G 3/32 | (2006.01) | |
| H04N 5/74 | (2006.01) | |

(52) U.S. Cl.
CPC .... G02B 27/0172 (2013.01); *G09G 2310/0251* (2013.01); *H04N 5/7491* (2013.01); G02B 27/017 (2013.01); *G02B 2027/0132* (2013.01); *G09G 2300/0861* (2013.01); G01C 21/365 (2013.01); *G09G 2300/0842* (2013.01); G09G 3/3225 (2013.01); *G02B 2027/0178* (2013.01); *G02B 2027/014* (2013.01); *G02B 2027/0112* (2013.01)
USPC .......................................................... 345/8

(58) Field of Classification Search
USPC ........ 345/7–8, 76–78; 340/988; 701/209, 213
See application file for complete search history.

(56) References Cited

U.S. PATENT DOCUMENTS

| | | | |
|---|---|---|---|
| 5,162,828 A | | 11/1992 | Furness et al. |
| 5,561,538 A | | 10/1996 | Kato et al. |
| 5,585,871 A | | 12/1996 | Linden |
| 5,682,210 A | | 10/1997 | Weirich |
| 5,703,436 A | | 12/1997 | Forrest et al. |
| 5,707,745 A | | 1/1998 | Forrest et al. |
| 5,714,967 A | * | 2/1998 | Okamura et al. ............. 345/8 |
| 5,721,160 A | | 2/1998 | Forrest et al. |
| 5,742,264 A | * | 4/1998 | Inagaki et al. ............... 345/8 |
| 5,757,026 A | | 5/1998 | Forrest et al. |

(Continued)

FOREIGN PATENT DOCUMENTS

| | | |
|---|---|---|
| EP | 0 821 257 A2 | 1/1998 |
| EP | 1119059 A2 | 7/2001 |

(Continued)

*Primary Examiner* — Waseem Moorad
(74) *Attorney, Agent, or Firm* — Fish & Richardson P.C.

(57) ABSTRACT

The invention provides a display device with which a user's view is not completely interrupted by an image that is displayed artificially and of which optical system is easy in design. In addition, the invention provides a telecommunication system capable of providing additional visual information by the use of the display device. According to the invention, an image can be displayed while securing a user's view by using a light emitting device that can display an image and transmit light as a display device. Specifically, a pair of electrodes included in a light emitting element is formed to transmit light so as to transmit the outside light. By crossing a visual axis of a user and a pixel portion of the light emitting device, both of the outside light and the light emitted from the pixel portion can enter into the eyeballs of a user.

17 Claims, 12 Drawing Sheets

(56) References Cited

U.S. PATENT DOCUMENTS

| | | | |
|---|---|---|---|
| 5,812,101 | A * | 9/1998 | Monarchie et al. ............... 345/8 |
| 5,815,126 | A | 9/1998 | Fan et al. |
| 5,913,591 | A * | 6/1999 | Melville ........................... 345/9 |
| 5,964,821 | A * | 10/1999 | Brunts et al. ................... 701/201 |
| 5,999,237 | A | 12/1999 | Miyawaki |
| 6,030,700 | A | 2/2000 | Forrest et al. |
| 6,057,966 | A * | 5/2000 | Carroll et al. ..................... 345/8 |
| 6,072,445 | A * | 6/2000 | Spitzer et al. ..................... 345/8 |
| 6,140,980 | A * | 10/2000 | Spitzer et al. ..................... 345/8 |
| 6,144,347 | A | 11/2000 | Mizoguchi et al. |
| 6,204,808 | B1 * | 3/2001 | Bloebaum et al. ........ 342/357.07 |
| 6,264,805 | B1 | 7/2001 | Forrest et al. |
| 6,358,631 | B1 | 3/2002 | Forrest et al. |
| 6,365,270 | B2 | 4/2002 | Forrest et al. |
| 6,421,031 | B1 | 7/2002 | Ronzani et al. |
| 6,424,321 | B1 | 7/2002 | Ronzani et al. |
| 6,448,944 | B2 | 9/2002 | Ronzani et al. |
| 6,452,544 | B1 * | 9/2002 | Hakala et al. ............. 342/357.31 |
| 6,452,572 | B1 | 9/2002 | Fan et al. |
| 6,548,956 | B2 | 4/2003 | Forrest et al. |
| 6,553,308 | B1 * | 4/2003 | Uhlmann et al. ............. 701/208 |
| 6,573,952 | B1 | 6/2003 | Yamazaki et al. |
| 6,596,134 | B2 | 7/2003 | Forrest et al. |
| 6,683,584 | B2 | 1/2004 | Ronzani et al. |
| 6,735,328 | B1 * | 5/2004 | Helbing et al. ............... 382/117 |
| 6,867,752 | B1 | 3/2005 | Yamazaki et al. |
| 6,995,509 | B2 | 2/2006 | Yamazaki et al. |
| 7,148,502 | B2 | 12/2006 | Yamazaki et al. |
| 7,158,098 | B2 | 1/2007 | Yamazaki et al. |
| 7,173,369 | B2 | 2/2007 | Forrest et al. |
| 7,218,294 | B2 | 5/2007 | Koyama et al. |
| 7,310,072 | B2 | 12/2007 | Ronzani et al. |
| 7,714,504 | B2 | 5/2010 | Forrest et al. |
| 8,026,877 | B2 | 9/2011 | Osame |
| 8,659,523 | B2 | 2/2014 | Osame |
| 2001/0054989 | A1 | 12/2001 | Zavracky et al. |
| 2003/0160746 | A1 * | 8/2003 | Yamazaki et al. ............... 345/82 |
| 2004/0004434 | A1 | 1/2004 | Nishi et al. |
| 2004/0070809 | A1 | 4/2004 | Senbonmatsu |
| 2004/0169624 | A1 | 9/2004 | Yamazaki et al. |
| 2004/0183082 | A1 | 9/2004 | Yamazaki |
| 2004/0201545 | A1 | 10/2004 | Yamazaki et al. |
| 2004/0201548 | A1 | 10/2004 | Watanabe et al. |
| 2004/0227698 | A1 | 11/2004 | Yamazaki et al. |
| 2004/0239231 | A1 | 12/2004 | Miyagawa et al. |
| 2004/0257473 | A1 | 12/2004 | Miyagawa |
| 2004/0263056 | A1 | 12/2004 | Seo et al. |
| 2004/0263066 | A1 | 12/2004 | Abe et al. |
| 2004/0263069 | A1 | 12/2004 | Yamazaki et al. |
| 2005/0005848 | A1 | 1/2005 | Yamazaki et al. |
| 2005/0024293 | A1 | 2/2005 | Sakata et al. |
| 2005/0024339 | A1 | 2/2005 | Yamazaki et al. |
| 2005/0040753 | A1 | 2/2005 | Osame et al. |
| 2005/0052348 | A1 | 3/2005 | Yamazaki et al. |
| 2005/0127820 | A1 | 6/2005 | Yamazaki et al. |
| 2006/0164006 | A1 | 7/2006 | Yamazaki et al. |
| 2006/0231842 | A1 | 10/2006 | Hirakata et al. |
| 2007/0085075 | A1 | 4/2007 | Yamazaki et al. |
| 2007/0108454 | A1 | 5/2007 | Yamazaki et al. |
| 2007/0120475 | A1 | 5/2007 | Ishitani et al. |
| 2007/0131976 | A1 | 6/2007 | Kanno et al. |
| 2007/0159044 | A1 | 7/2007 | Ishitani et al. |
| 2007/0177088 | A1 | 8/2007 | Koyama et al. |
| 2007/0178224 | A1 | 8/2007 | Fujii et al. |
| 2008/0122736 | A1 | 5/2008 | Ronzani et al. |
| 2008/0174514 | A1 | 7/2008 | Yamazaki et al. |
| 2010/0187988 | A1 | 7/2010 | Forrest et al. |

FOREIGN PATENT DOCUMENTS

| | | | |
|---|---|---|---|
| JP | 06-066177 | | 9/1994 |
| JP | 07-005409 | | 1/1995 |
| JP | 07-084519 | A | 3/1995 |
| JP | 09-504120 | A | 4/1997 |
| JP | 09-159747 | A | 6/1997 |
| JP | 09-211374 | A | 8/1997 |
| JP | 09211374 | A * | 8/1997 |
| JP | 2000507029 | A | 6/2000 |
| JP | 2001-074493 | A | 3/2001 |
| JP | 2001-305988 | | 11/2001 |
| JP | 2001305988 | A * | 11/2001 |
| JP | 2003505718 | A | 2/2003 |
| JP | 2005097774 | A | 4/2005 |
| WO | 95/11473 | A1 | 4/1995 |
| WO | 9619792 | A2 | 6/1996 |
| WO | 9733296 | A1 | 9/1997 |
| WO | 9806242 | A1 | 2/1998 |
| WO | WO98-29775 | | 7/1998 |
| WO | 0106298 | A1 | 1/2001 |

\* cited by examiner

DISPLAY DEVICE AND TELECOMMUNICATION SYSTEM

BACKGROUND OF THE INVENTION

1. Field of the Invention

The present invention relates to a display device using light emitting elements, and to a telecommunication system using the display device.

2. Description of the Related Art

A goggle display device has the characteristics of portability that enable the use of the device while it is worn by a user, and it has the advantage of providing visual information in any place without tying up user's hands. A goggle display device is sometimes called a face mounted display or a head mounted display. As for a goggle display device that is in practical use at present, there is the one that displays an image by using a liquid crystal display device (LCD).

Besides the goggle display device using a liquid crystal display device, a goggle display device that can display an image by using a self-luminous light emitting device is proposed in recent years. A light emitting device using light emitting elements emits light by itself, therefore, it has high visibility and requires no backlight unlike a liquid crystal display device, which makes it possible to have a less complex optical system. Thus, it is suitable for the downsizing of a goggle display device. In addition, it is proposed that a goggle display device that can provide a visual image to a user by writing an image directly to his retinas with laser light and the like is proposed, without the use of a liquid crystal display device or a light emitting device.

SUMMARY OF THE INVENTION

As described above, goggle display devices in various modes are proposed, such as the one using a light emitting device and the one that directly writes an image to the retinas of a user as well as the goggle display device using a liquid crystal display device. However, each of the aforementioned goggle display devices has a problem in that a user's view is interrupted by the use of the very device.

That is, in the case of the goggle display device using a liquid crystal display device or a light emitting device, a user is prohibited from seeing the surrounding scenery within his view in an area where an image is displayed by the liquid crystal display device or the light emitting device. Therefore, the user's movement is restricted, which makes it difficult to take the advantage of the goggle display device that ensures the free use of user's hands.

Even in a goggle display device that directly writes an image to the retinas of a user, it is difficult for him to sense his surrounding scenery as light in the portion of the retinas to which an image is written. Therefore, it is difficult for the user to see the surrounding scenery within his view in the area where the image is displayed. Further, in the goggle display device that directly writes an image to the retinas of a user, a green laser diode, which is one of the three primary colors of light has not been put into practical use yet. Therefore, it is difficult to display a full color image by this device.

It is considered to be possible for a user to recognize an image that is artificially displayed by a goggle display device and his surrounding scenery at the same time by exercising ingenuity on the optical system of the goggle display device. In this case, however, high-level techniques are required in the design phase of the optical system.

In addition, navigation systems that display information on the present position of an object obtained by the use of a GPS (Global Positioning System) are advancing remarkably in recent years. Among them, a car navigation system has been in practical use over decades, and is in widespread use currently. However, a conventional navigation system typified by the car navigation system has a problem in that it is difficult for a user to be cautious of the surrounding environment around him when looking downward to watch the display device.

In the case where this navigation system is applied to a goggle display device, in particular, a user cannot see the surrounding scenery that overlaps with the area where an image is displayed by the goggle display device. Accordingly, it is not suitable for the use under the circumstance that requires to pay attention to the surroundings. In addition, even when information is obtained by the navigation system, the goggle display device has to be taken off when a user wants to see the surrounding circumstances or move. Therefore, it is required to be taken on/off frequently, which leads to the low usability. Thus, it has been difficult to find a merit in the application of the navigation system to the goggle display device.

In view of the foregoing problems, the invention provides a goggle display device with which a user's view is not completely interrupted by an image that is displayed artificially and of which optical system is easy in design. In addition, the invention provides a telecommunication system capable of providing additional visual information by the use of the goggle display device.

According to the invention, an image can be displayed while securing a user's view by using a light emitting device that can display an image and transmit light as a goggle display device. Specifically, in the invention, a pair of electrodes of a light emitting element is formed to transmit light so as to transmit the outside light. By crossing a visual axis of a user with a pixel portion of the light emitting device, both of the outside light and the light emitted from the pixel portion can be injected into the eyeballs of the user.

That is, the goggle display device of the invention includes a light emitting device having a pixel portion in which a light emitting element is disposed in each pixel and a supporting portion used for a user to wear the light emitting device. A pair of electrodes of the light emitting element transmits light. The supporting portion allows the light emitting device to be fixed on the position at which a user's visual axis can cross the pixel portion. The goggle display device of the invention may further include an optical system that brings the light passing through the pixel portion and the light emitted from the light emitting device into focus on the retinas of a user.

An OLED (Organic Light Emitting Diode) that is one of the light emitting elements includes two electrodes of an anode and a cathode and a layer including an electroluminescent material (hereinafter referred to as an electroluminescent layer) that can obtain luminescence (Electroluminescence) when an electric field is applied thereto.

In addition, the invention can provide a telecommunication system in which a navigation system is applied to the goggle display device of the invention. According to the telecommunication system of the invention, a user can receive the positional information of an object that is obtained by a GPS, and can also receive the information on the object that is obtained from the positional information from the goggle display device, while seeing his surrounding scenery. It should be noted that the goggle display device denotes a display device that is worn a light emitting device on the head of a user.

According to the invention, a goggle display device can be provided, which allows a user to recognize an image displayed artificially and his surrounding scenery at the same time without making an optical system complex. Accordingly, the user can be cautious about the surrounding circumstances of himself more easily in using the goggle display device, which significantly enhances the usability of the goggle display device. In addition, by using the goggle display device of the invention having the aforementioned structure, the aforementioned telecommunication system can be realized.

According to the telecommunication system of the invention, it is possible that an image of an object and an image including the information on the object are superimposed to be displayed at the same time. Accordingly, it becomes easier to check the object with the information on the object. In addition, since the surrounding scenery can be seen without taking off the goggle display device, it is not required that the goggle display device is taken on/off frequently when using the telecommunication system. Thus, the usability can be significantly enhanced.

DESCRIPTION OF THE INVENTION

Figure 1A:
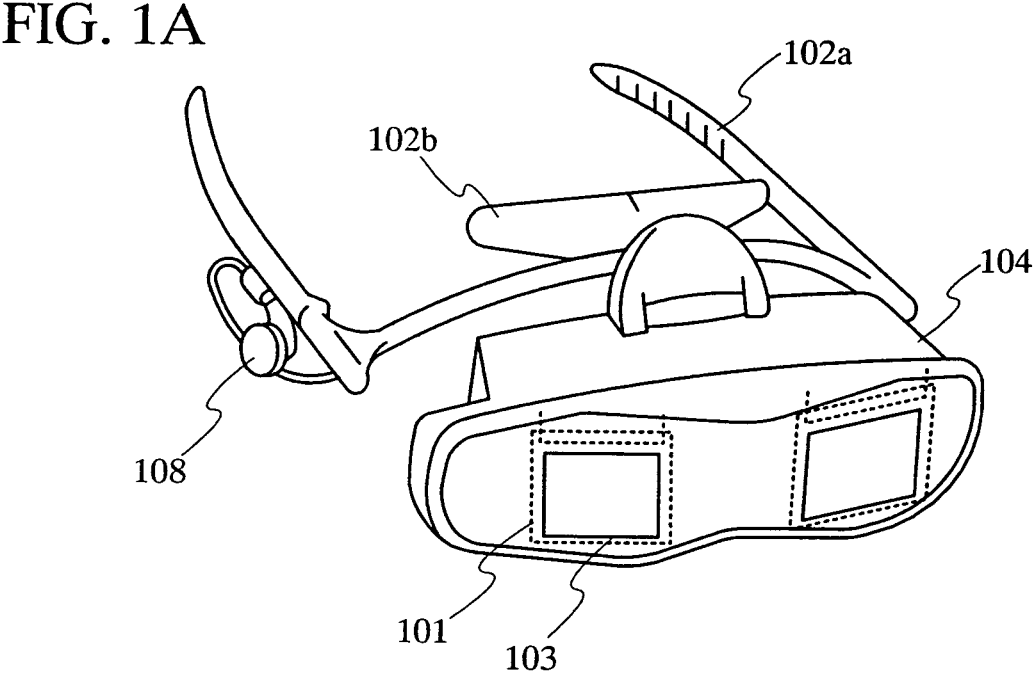
FIGS. 1A and 1B illustrate an oblique perspective view and a cross sectional view of the goggle display device of the invention respectively.

FIG. 1A shows an oblique perspective view of the goggle display device of the invention as one mode. Reference numeral 101 denotes a light emitting device. Two light emitting devices 101 are provided for a right eye and a left eye in the goggle display device shown in FIG. 1A. It should be noted that the number of the light emitting devices that are used in the goggle display device of the invention is not limited to this. Only one light emitting device may be provided for one eye, or one light emitting device that can be seen by both eyes may be provided as well.

Each of the light emitting devices 101 includes a pixel portion 103 in which a plurality of light emitting elements are formed. The goggle display device of the invention includes supporting portions 102a and 102b used for a user to wear the light emitting devices 101 so that the pixel portion 103 crosses the visual axis of the user. It should be noted that FIG. 1A shows the supporting portions 102a and 102b for fixing the light emitting devices 101 on the head and ears of a user, however, the invention is not limited to this. The supporting portions may be of a type that fixes the light emitting devices 101 on the head, or of a type that fixes the light emitting devices 101 on the body other than the head of a user.

In addition, in FIG. 1A, the light emitting devices 101 are incorporated in a housing 104. The housing 104 has a structure in which a portion that overlaps with the pixel portion 103 transmits light. It should be noted that the goggle display device of the invention is not necessarily required to have a housing for incorporating the light emitting devices, and the light emitting devices may be exposed to the outside.

The goggle display device of the invention may include a microphone or a converter that generates sound wave in response to a current. In FIG. 1A, the goggle display device having an earphone 108 is shown as an example. The operation of the light emitting devices may be controlled by a remote control or an operating switch that is provided in the goggle display device.

The goggle display device shown in FIG. 1A may have an optical system that brings the light passing through the pixel portion and the light emitted from the light emitting devices into focus on the retinas of a user. By using the aforementioned optical system, it is possible for the eyes of a user to recognize his surrounding scenery and an image that is displayed artificially by the goggle display device at the same time.

Figure 1B:
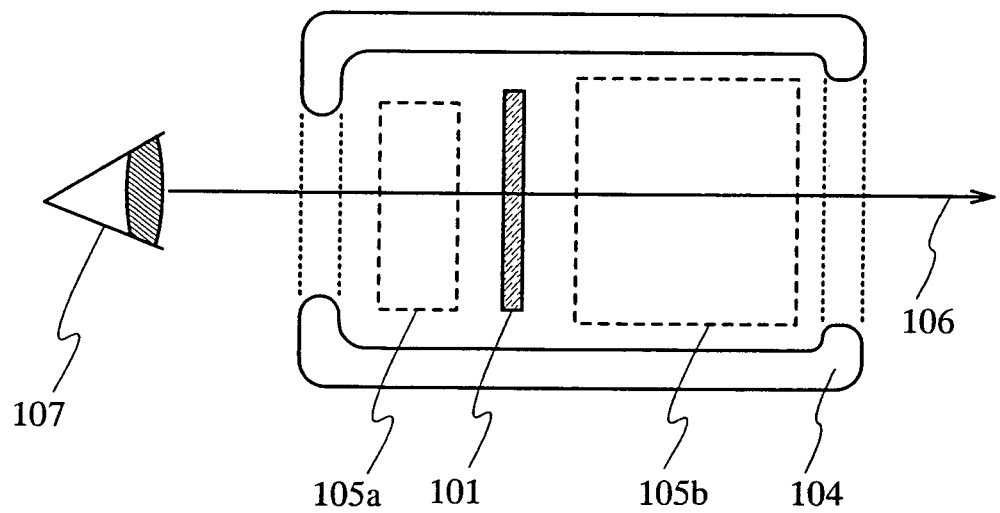

In order to show the positional relationship among the light emitting device 101, an optical system, and a visual axis of a user more clearly, FIG. 1B shows a cross sectional view in the case where the goggle display device shown in FIG. 1A includes an optical system. In FIG. 1B, reference numeral 106 denotes a visual axis extending from an eyeball 107 of a user to an object. FIG. 1B shows a mode in which two optical systems 105a and 105b are provided, and the visual axis 106 crosses the optical system 105a, the light emitting device 101, and the optical system 105b in this order from the closest side to the eyeball 107 of the user.

Figure 2:
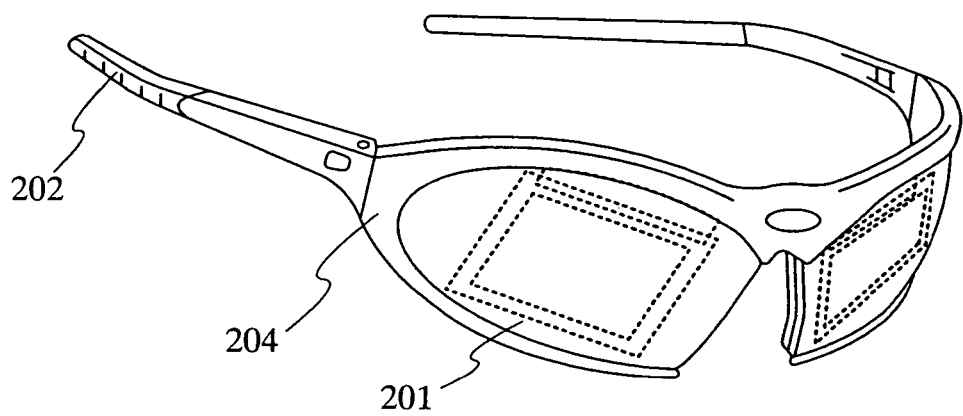
FIG. 2 illustrates an oblique perspective view of the goggle display device of the invention.

FIG. 1B shows a case where two optical systems 105a and 105b are provided, however, the invention is not limited to this. It is also possible that only one of the optical systems 105a and 105b is provided. In addition, the optical system is not necessarily provided in the invention. FIG. 2 shows an oblique perspective view of a goggle display device without an optical system. In FIG. 2, reference numeral 201 denotes a light emitting device that is incorporated in a housing 204. Reference numeral 202 denotes a supporting portion. By providing no optical system for taking the focus as in the goggle display device shown in FIG. 2, the goggle display device can be downsized and the cost thereof can be reduced.

Figure 3A:
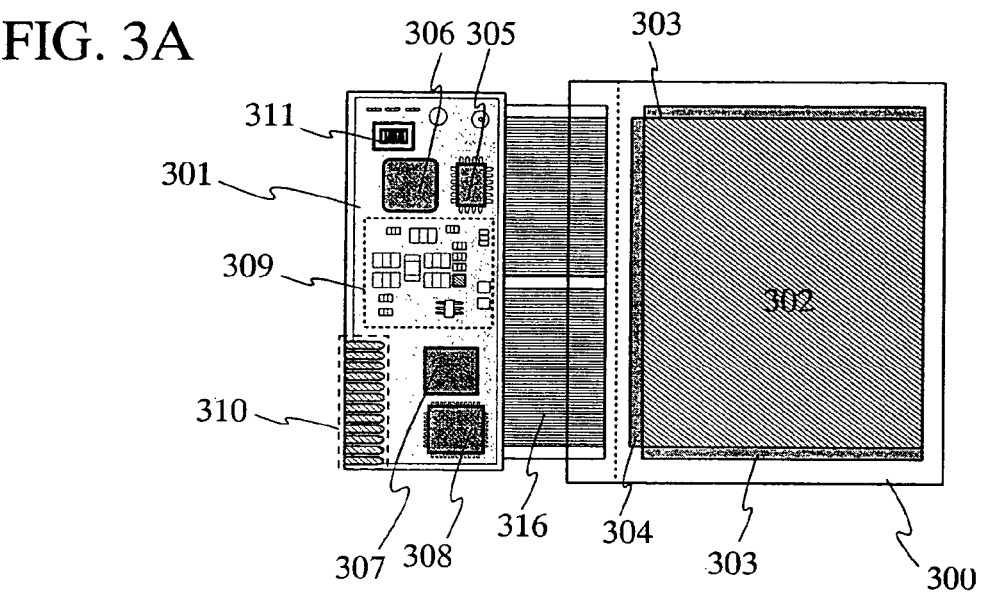
FIGS. 3A and 3B illustrate a diagram showing a module of a light emitting device used in the goggle display device of the invention and a block diagram of the module respectively.

Now, a configuration of a light emitting device that is used in the goggle display device of the invention is described. It should be noted that the light emitting device includes either mode of a panel in which a pixel portion is provided or a module in which an IC is mounted on the panel. FIG. 3A shows a top plan view of a light emitting device that corresponds to the module.

The light emitting device shown in FIG. 3A includes a panel 300 and a printed wiring board 301 mounted to the panel 300. On the panel 300, a pixel portion 302 in which a light emitting element is disposed in each pixel, a scan line driver circuit 303 for selecting a pixel in the pixel portion 302, and a signal line driver circuit 304 for supplying a video signal to the selected pixel.

It should be noted that FIG. 3A shows an example in which the scan line driver circuit 303 and the signal line driver circuit 304 are formed on the same substrate as the pixel portion 302, however, the invention is not limited to this. It is also possible that a part of or the whole of the scan line driver circuit 303 and the signal line driver circuit 304 is formed on a different substrate, and then mounted to the panel 300. In this case, TAB or COG bonding may be used for the mounting.

Over the printed wiring board 301, various circuits for generating signals or power supply voltages to be supplied to the panel 300 are mounted. It should be noted that in the case of using a goggle display device in the telecommunication system of the invention, the module of the aforementioned light emitting device may be mounted with a transmitter/receiver circuit for processing various signals that are transmitted/received with an antenna, an arithmetic circuit for calculating the positional information by using a GPS signal that has been processed in the transmitter/receiver circuit, a memory for storing the processed GPS signal and the positional information as data, and the like.

FIG. 3A shows various circuits mounted on the printed wiring board 301 in the case where a goggle display device is used in the telecommunication system of the invention. Specifically, a controller 305, a CPU 306 including an arithmetic circuit, a memory 307, a power supply circuit 308, and a transmitter/receiver circuit 309 are mounted as well as other elements such as a resistor, a buffer, and a capacitor. It should be noted that various circuits mounted on the panel 300 are not limited to the aforementioned combination. In addition, among the circuits shown in FIG. 3A, the controller 305, the CPU 306, the memory 307, the power supply circuit 308, and the like may be formed on the panel 300.

It should be noted that the panel 300 is connected to the printed wiring board 301 through an FPC 316, however, the mode of the light emitting device of the invention is not limited to this. For example, various circuits for controlling the operation of the panel 300 may be mounted directly onto the panel 300 by COG bonding.

Power supply voltages and various signals are supplied to the printed wiring board 301 through an interface (I/F) portion 310 for the printed wiring board, in which a plurality of input terminals is disposed. In addition, an antenna port 311 for transmitting/receiving signals to/from an antenna is provided on the printed wiring board 301.

In the printed wiring board 301, in some cases, a power supply voltage and a signal are interrupted by a noise, or a rising edge of a signal is delayed due to a capacitance formed between lead wirings or a resistance of a wiring itself. Such interruption of a power supply voltage and a signal by a noise, and a delay in the rising edge of a signal can be prevented by providing various elements such as a capacitor element and a buffer on the printed wiring board 301.

Figure 3B:
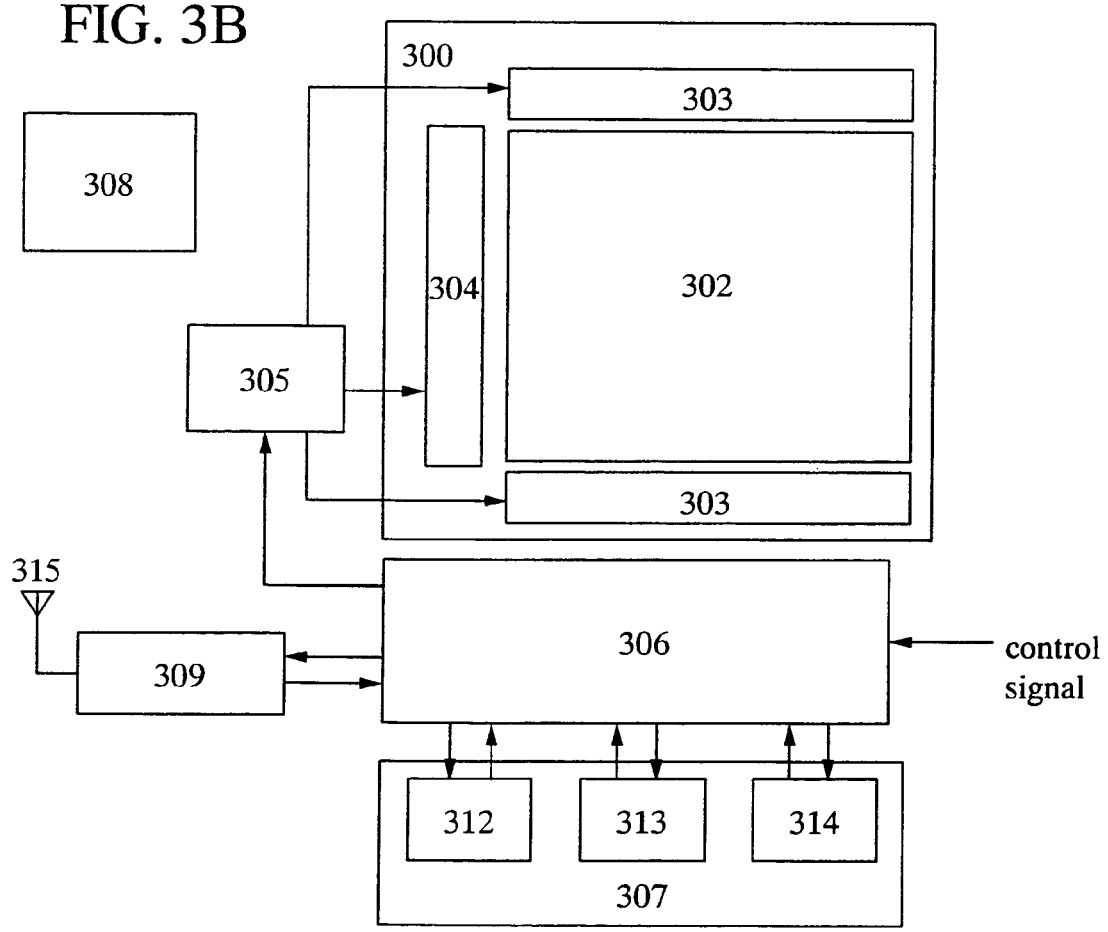

FIG. 3B shows a block diagram of the module shown in FIG. 3A.

In this embodiment, the memory 307 includes a VRAM 312, a DRAM 313, a flash memory 314, and the like. The VRAM 312 and the DRAM 313 store image data to be displayed on the panel, and the flash memory 314 stores various programs.

The power supply circuit 308 generates power supply voltages to be supplied to the panel 300, the controller 305, the CPU 306, the memory 307, and the transmitter/receiver circuit 309. Depending on the specification of the panel 300, the power supply circuit 308 is provided with a current source.

A signal (control signal) for controlling the operation of the panel 300 is inputted to the goggle display device with a remote control or an operating switch. Specifically, the control signal is transferred to the CPU 306 mounted on the printed wiring board 301 through the interface 310. The CPU 306 can transform image data stored in the VRAM 312 or the DRAM 313 into a predetermined format in accordance with the control signal, which is subsequently transferred to the controller 305.

The controller 305 performs data processing to a signal including the image data transferred from the CPU 306 in accordance with the specification of the panel 300, and then supplies it to the panel 300. The controller 305 generates an Hsync signal, a Vsync signal, a clock signal CLK, an alternating voltage (AC Cont), and a switch signal L/R based on the power supply voltage inputted from the power supply circuit 308 and various signals inputted from the CPU, and then supplies them to the panel 300.

The transmitter/receiver circuit 309 processes a signal that is transmitted/received as a radio wave in an antenna 315, and specifically, it includes a high-frequency circuit such as an isolator, a bandpass filter, a VCO (Voltage Controlled Oscillator), an LPF (Low Pass Filter), a coupler, and a balun.

It should be noted that the module shown in FIGS. 3A and 3B may include a dedicated receiver circuit for processing a GPS signal that is transmitted from a positioning artificial satellite (GPS satellite)

Figure 4:
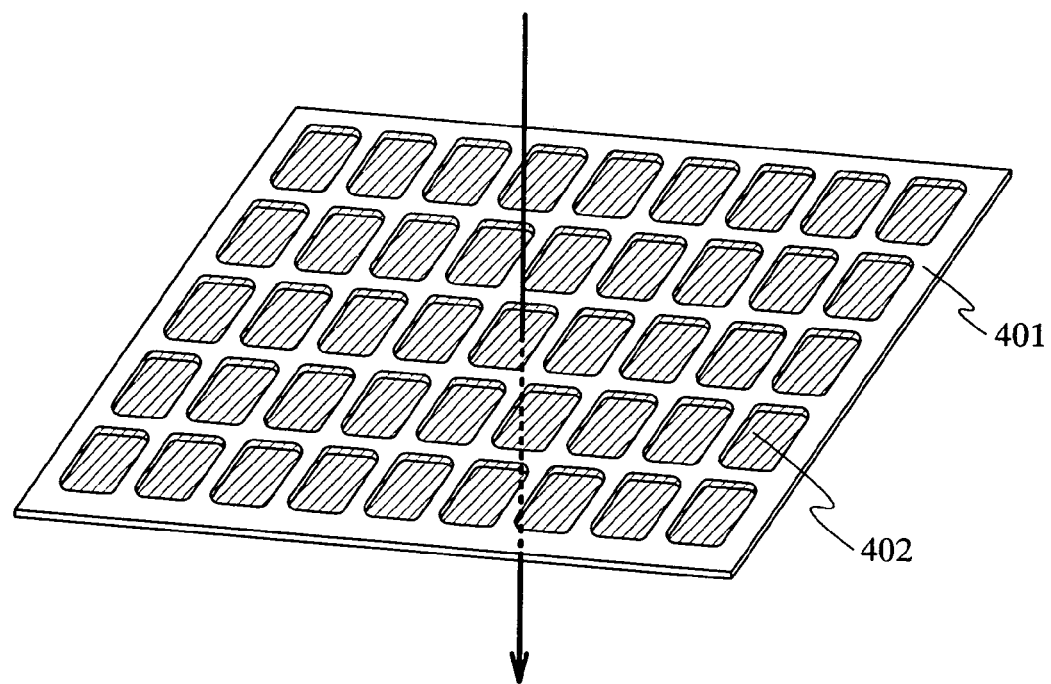
FIG. 4 illustrates an enlarged view of a pixel portion.

FIG. 4 shows an enlarged view of a pixel portion of a light emitting device that is used in the goggle display device of the invention. In FIG. 4, reference numeral 401 denotes a pixel portion in which a plurality of pixels 402 are disposed. Each of the pixels 402 includes a light emitting element, and the light emitting element uses a light transmissive electrode as an anode and a cathode. Accordingly, light passes through the pixel 402 as shown by an arrow, whereby a state where a far side of the pixel portion 401 is seen through is obtained. Light emitted from a light emitting element is emitted to both sides of the pixel portion 401.

Figure 5A:
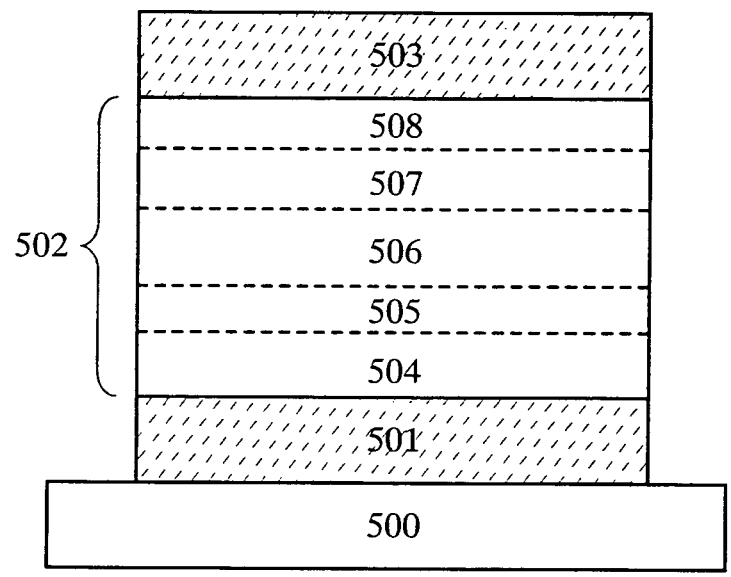
FIGS. 5A and 5B each illustrates a structure of a light emitting element.
Figure 5B:
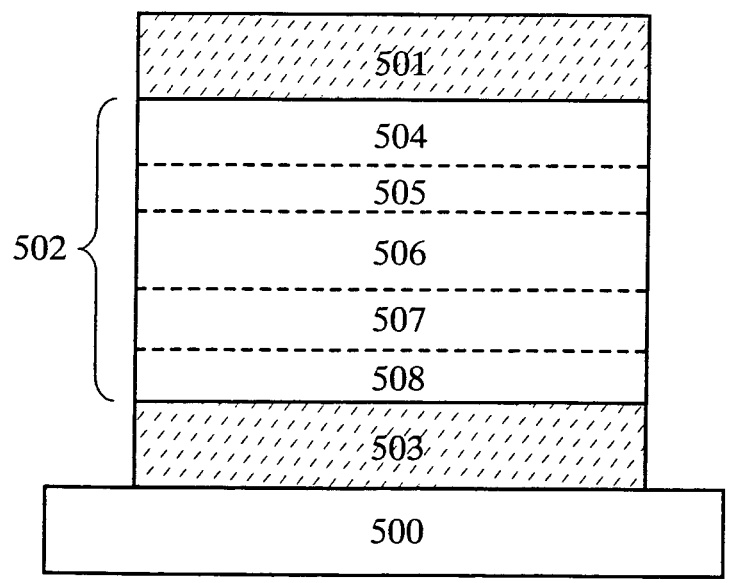

Next, structure of a light emitting element is described with reference to FIGS. 5A and 5B. FIG. 5A schematically shows an element structure of the light emitting element of the invention.

The light emitting element shown in FIG. 5A includes a substrate 500, over which a first electrode (anode) 501, an electroluminescent layer 502, and a second electrode (cathode) 503 are formed in sequence. It should be noted that various layers or semiconductor elements are provided between the substrate 500 and the first electrode 501 in practice.

The first electrode 501 corresponds to an anode, therefore, it is desirably formed of a conductive material having a high work function. For example, a conductive material using light transmissive oxide (conductive material containing light transmissive oxide) such as indium tin oxide (ITO), zinc oxide (ZnO), indium zinc oxide (IZO), gallium-doped zinc oxide (GZO), indium tin oxide containing silicon oxide (ITSO) may be used as the first electrode 501. Alternatively, TiN, ZrN, Ti, W, Ni, Pt, Cr, Ag, Al, or the like may be formed with an enough thickness to transmit light (around 5 nm to 30 nm) to be used as the first electrode 501. In this case, however, the first electrode 501 may be laminated with a conductive film formed of a conductive material containing light transmissive oxide in order to lower sheet resistance.

The second electrode 503 corresponds to a cathode, therefore, it is desirably formed of a conductive material having a low work function. For example, a metal having a low work function, an alloy, an electrically conductive compound, or mixture of them with an enough thickness to transmit light may be used as the second electrode 503. Specifically, the second electrode 503 may be formed by using an alkaline metal such as Li and Cs, an alkaline earth metal such as Mg, Ca and Sr, an alloy containing these metals (such as Mg:Ag and Al:Li), or an rare earth metal such as Yb and Er with a thickness of around 5 nm to 30 nm. In the case of providing a fifth layer 508 that functions as an electron injection layer, Al, a conductive material containing light transmissive oxide, and the like may be used as the second electrode 503. However, in the case of a material such as Al that does not transmit light, it is formed to have an enough thickness to transmit light. It should be noted that in the case of forming the second electrode 503 with a thickness of around 5 nm to 30 nm, it is possible that a light transmissive conductive layer is formed on the second electrode 503 by using a conductive material containing light transmissive oxide in order to lower sheet resistance of the second electrode 503.

By allowing the first electrode 501 and the second electrode 503 to transmit light, the light emitting element can transmit the outside light.

The electroluminescent layer 502 is formed of a plurality of layers, which can be classified into a hole injection layer, a hole transporting layer, a light emitting layer, an electron transporting layer, an electron injection layer, and the like in view of the carrier transport property. There is no strict distinction between the hole injection layer and the hole transporting layer, and both of their characteristics are of a particular significance in the hole transportability (hole mobility). It is distinguished for convenience that a layer in contact with the anode is referred to as the hole injection layer and a layer in contact with the hole injection layer is referred to as the hole transporting layer. It is the same with the electron transporting layer and the electron injection layer. A layer in contact with the cathode is referred to as the electron injection layer and a layer in contact with the electron injection layer is referred to as the electron transporting layer. In some cases, the light emitting layer is combined with the electron transporting layer, and it is referred to as a light transmissive electron transporting layer. Shown in FIG. 5A is an example where the electroluminescent layer 502 includes first to fifth layers 504 to 508. The first to fifth layers 504 to 508 are laminated in this order from the first electrode 501 to the second electrode 503.

The first layer 504 functions as a hole injection layer, therefore, a material that has hole transportability, relatively low ionization potential, and high hole injectability is desirably used. It can roughly be classified into metal oxide, a low molecular weight organic compound, and a high molecular weight organic compound. As for the metal oxide, for example, vanadium oxide, molybdenum oxide, ruthenium oxide, aluminium oxide, and the like can be used. As for the low molecular weight organic compound, for example, starburst amine typified by m-MTDATA, metallophthalocyanine typified by copper phthalocyanine (abbreviated to Cu-Pc), phthalocyanine (abbreviated to $H_2$-Pc), 2,3-dioxyethylene thiophene derivative, and the like can be used. Alternatively, a film in which a low molecular weight organic compound and the aforementioned metal oxide are codeposited may be used. As for the high molecular weight organic compound, for example, high molecule such as polyaniline (abbreviated to PAni), polyvinylcarbazole (abbreviated to PVK), and polythiophene derivative can be used. Alternatively, polyethylene dioxythiophene (abbreviated to PEDOT) as one of the polythiophene derivative doped with polystyrenesulphonic (abbreviated to PSS) may be used. In addition, benzoxazole derivative may be used in combination with one or more of TCQn, $FeCl_3$, $C_{60}$, and $F_4TCNQ$.

The second layer 505 functions as a hole transporting layer, therefore, a known material having high hole transportability and low crystallinity is desirably used. Specifically, an aromatic amine-based compound (namely, the one having benzene ring-nitrogen bonds) is suitable. For example, there are 4,4'-bis[N-(3-methylphenyl)-N-phenyl-amino]-biphenyl (TPD), and its derivative: 4,4'-bis[N-(1-naphthyl)-N-phenyl-amino]-biphenyl (a-NPD), and the like. Alternatively, 4,4',4"-tris(N,N-diphenyl-amino)-triphenylamine (TDATA), or a starburst aromatic amine compound such as MTDATA can be used. In addition, 4,4'-4"-tris(N-carbazolyl)triphenylamine (abbreviated to TCTA) may be used. In addition, a high molecular weight material such as poly(vinyl carbazole) exhibiting good hole transportability can be used.

The third layer 506 functions as a light emitting layer, therefore, a material having high ionization potential and a large bandgap is desirably used. Specifically, a metal complex such as tris(8-quinolinolato)aluminum ($Alq_3$), tris(4-methyl-8-quinolinolato)aluminum ($Almq_3$), bis(10-hydroxybenzo[η]-quinolinato)beryllium ($BeBq_2$), bis(2-methyl-8-quinolinolate)-(4-hydroxy-biphenylyl)aluminum (BAlq), bis[2-(2-hydroxyphenyl)-benzoxazolato]zinc ($Zn(BOX)_2$), and bis[2-(2-hydroxyphenyl)-benzothiazolato]zinc ($Zn(BTZ)_2$) can be used. Alternatively, various fluorescent pigments can be used, such as a coumarin derivative, a quinacridone derivative, rubrene, 4,4-dicyanomethylene, a 1-pyrone derivative, a stilbene derivative, and various condensed aromatic compounds. In addition, a phosphorescent material such as a platinum octaethylporphyrin complex, a tris(phenyl pyridine) iridium complex, and a tris(benzylidene acetonate) phenanthrene europium complex can be used as well.

As a host material used for the third layer 506, a hole transporting material or an electron transporting material typified by the aforementioned examples can be used. Alternatively, a bipolar material such as 4,4'-N,N'-dicarbazolyl-biphenyl (abbreviated to CBP) can be used.

The fourth layer 507 functions as an electron transporting layer, therefore, a material having a high electron transportability is desirably used. Specifically, a metal complex having quinoline skeleton or benzoquinoline skeleton typified by $Alq_3$ or a mixed ligand complex thereof can be used. In particular, a metal complex such as $Alq_3$, $Almq_3$, $BeBq_2$, BAlq, $Zn(BOX)_2$, and $Zn(BTZ)_2$ can be used. Furthermore, other than the metal complex, an oxadiazole derivative such as 2-(4-biphenylyl)-5-(4-tert-butylphenyl)-1,3,4-oxadiazole (PBD) and 1,3-bis[5-(p-tert-butylphenyl)-1,3,4-oxadiazole-2-yl]benzene (OXD-7), a triazole derivative such as 3-(4-tert-butylphenyl)-4-phenyl-5-(4-biphenylyl)-1,2,4-triazole (TAZ), and 3-(4-tert-butylphenyl)-4-(4-ethylphenyl)-5-(4-biphenylyl)-1,2,4-triazole (p-EtTAZ), an imidazole derivative such as TPBI, and a phenanthroline derivative such as bathophenanthroline (BPhen) and bathocuproine (BCP) can be used for the electron transporting material.

The fifth layer 508 functions as an electron injection layer, therefore, a material having high electron injectability is desirably used. Specifically, an ultra thin film formed of an insulator such as alkaline metal halide typified by LiF and CsF, alkaline earth halide typified by $CaF_2$, and an alkaline metal oxide typified by $Li_2O$ are frequently used. Alternatively, an alkaline metal complex such as lithium acetylacetonate (abbreviated to Li(acac)) and 8-quinolinolato-lithium (abbreviated to Liq) is also effective. In addition, the fifth layer 508 may include metal oxide such as molybdenum oxide (MoOx), vanadium oxide (VOx), ruthenium oxide (RuOx), tungsten oxide (WOx) or benzoxazole derivative, and or one or more of an alkaline metal, an alkaline earth metal and a transition metal.

According to the light emitting element having the aforementioned structure, by applying a voltage between the first electrode 501 and the second electrode 503 and supplying a forward bias current to the electroluminescent layer 502, light can be emitted from the third layer 506 to the first electrode 501 side and the second electrode 503 side. It should be noted that the electroluminescent layer 502 does not necessarily include the first to fifth layers. According to the invention, it is required to have at least the third layer 506 that functions as a light emitting layer. In addition, light emission is not limited to the one from the third layer 506, and it can be obtained from the layer other than the third layer 506 according to a combination of materials used for the first to fifth layers. In addition, a hole blocking layer may be provided between the third layer 506 and the fourth layer 507.

It should be noted that depending on a color, a phosphorescent material may be preferably used than a fluorescent material since a drive voltage can be lowered, leading to enhance reliability. Then, in the case of performing a full color display using light emitting elements corresponding to the three primary colors, it is possible that degradation levels among the light emitting elements for three colors have few variations by combining a light emitting element using a fluorescent material and a light emitting element using a phosphorescent material.

FIG. 5A shows a structure of a light emitting element in which the first electrode 501 is closer to the substrate 500 than the second electrode 503, however, according to the invention, the second electrode 503 may be formed to be closer to the substrate 500 than the first electrode 501. In this case, the second electrode 503 is formed over the substrate 500 as shown in FIG. 5B, the electroluminescent layer 502 is formed on the second electrode 503, and the first electrode 501 is formed on the electroluminescent layer 502. The first to fifth layers 504 to 508 included in the electroluminescent layer 502 are laminated in this order from the second electrode 503 to the first electrode 501. In FIG. 5B, those shown in FIG. 5A are given the same reference numerals. In FIG. 5B, in practice, various layers, semiconductor elements, or the like are provided between the substrate 500 and the second electrode 503.

Now, the telecommunication system of the invention is described.

A goggle display device used in the telecommunication system of the invention has a light emitting device, an antenna for transmitting/receiving signals, a receiver circuit for receiving and processing GPS signals that are transmitted from a GPS satellite, and an arithmetic circuit for calculating positional information such as the latitude and the longitude by using the GPS signals. Besides the aforementioned means, a transmitter/receiver circuit for processing various signals other than GPS signals may be provided in the goggle display device. It should be noted that the transmitter/receiver circuit may be combined with the aforementioned receiver circuit as long as it is capable of processing the GPS signals. The goggle display device of the invention may have a means for detecting the direction in which the goggle display device faces by detecting the orientation with a direction sensor, gyrocompass, and the like.

Figure 6A:
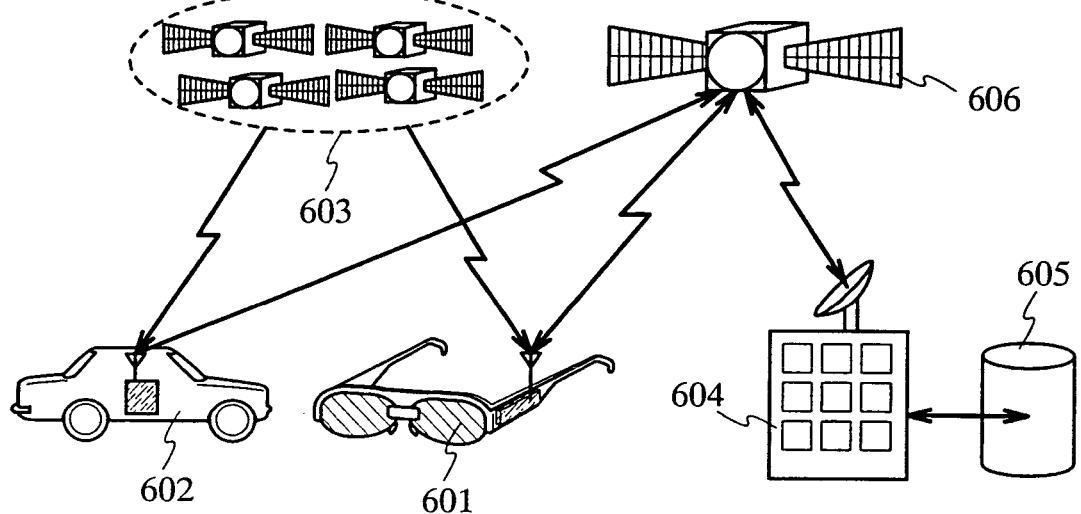
FIGS. 6A to 6C each illustrates a schematic view of a signal flow according to one mode of the telecommunication system of the invention.

FIG. 6A schematically shows a signal flow according to one mode of the telecommunication system of the invention. In FIG. 6A, reference numeral 601 denotes a goggle display device of the invention, 602 denotes a moving object (shown as an example here is a car), 603 denote GPS satellites, 604 denotes a wireless base station, and 605 denotes a database, and 606 denotes a telecommunication satellite.

The goggle display device 601 receives GPS signals from a plurality of GPS satellites 603, and calculates positional information by using the GPS signals. The calculated positional information of the goggle display device 601 is transmitted to the wireless base station 604 through the telecommunication satellite 606. It should be noted that transmittance/reception of signals between the goggle display device 601 and the wireless base station 604 is carried out through the telecommunication satellite 606 in FIG. 6A, however, the invention is not limited to this structure. It may be carried out directly with the wireless base station 604 or through an antenna disposed on the ground.

Meanwhile, the moving object 602 receives GPS signals from the plurality of GPS satellites 603 in the similar manner to the goggle display device 601, and calculates positional information by using the GPS signals. The calculated positional information of the moving object 602 is transmitted to the wireless base station 604 through the telecommunication satellite 606. It should be noted that the transmission path of the positional information to the wireless base station 604 is not limited to this.

In the wireless base station 604, various information on the positional information is pulled up from the database 605 by using the received positional information of the goggle display device 601. It should be noted that the information that is obtained from the positional information of the goggle display device 601 may be the one obtained through Internet, not the one stored in the database 605 in advance. The information on the positional information includes, for example, buildings, roads, climates, and the like around the goggle display device 601. Alternatively, in the wireless base station 604, various information on the positional information may be pulled up from the database 605 by using the received positional information of the moving object 602. In addition, the positional information is shown as an example of the information calculated by using the GPS signals in FIG. 6A, however, according to the invention, the information calculated by using the GPS signals is not limited to this. In case that the information such as environmental information, which fluctuates in real time, is obtained through Internet or the like, the new information can be stored in the database.

The wireless base station 604 transmits the pulled-up information on the positional information and the positional information of the moving object 602 to the goggle display device 601. The goggle display device 601 displays the received information on the light emitting device.

According to the positional information of the goggle display device 601, a user can obtain the positional information of himself and the information on it. Further, by adding the information on the moving object 602, it is possible to obtain the information on the moving object 602 that is around the user, which leads to avoid the dangerous situation.

Figure 6B:
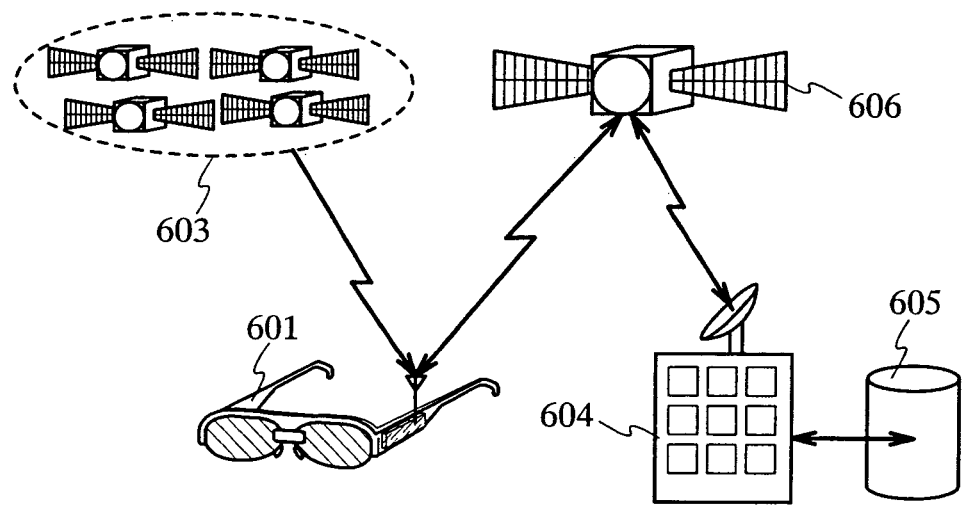

It should be noted that FIG. 6A shows an example where the goggle display device 601 displays both of the positional information of the moving object 602 and the information on the positional information pulled up from the database 605, however, not both of the information is always required. FIG. 6B schematically shows a signal flow according to one mode of the communicating system of the invention in the case where the positional information of the moving object 602 is not received, but only the information on the positional information of the goggle display device 601 is used.

In FIG. 6B, the goggle display device 601 can receive only the information on the positional information of the goggle display device from the wireless base station 604, and display it. It should be noted that according to the invention, the goggle display device may receive only the positional information of the moving object 602, not the information on the positional information of the goggle display device, unlike FIGS. 6A and 6B.

Figure 6C:
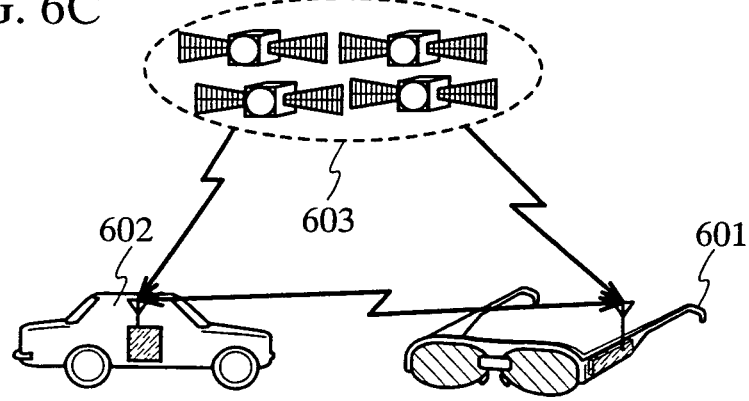

In addition, according to the telecommunication system of the invention, the positional information may be transmitted/ received directly between the goggle display device 601 and the moving object 602. FIG. 6C schematically shows a signal flow according to one mode of the telecommunication system of the invention in the case of directly transmitting/receiving mutual positional information between the goggle display device 601 and the moving object 602. In FIG. 6C, the goggle display device 601 and the moving object 602 obtain the respective positional information by using GPS signals obtained from the GPS satellite 603. The goggle display device 601 receives the positional information of the moving object 602 and displays both of the positional information of the goggle display device itself and the positional information of the moving object 602 on the light emitting device. It should be noted that the positional information of the goggle display device 601 may be transmitted to the moving object 602 as well.

It should also be noted that FIG. 6C shows the case where the goggle display device 601 receives the positional information of the moving object 602, however, the information obtained from the moving object 602 is not limited to the positional information. For example, the presence of the moving object 602 may be identified directly by using a sensor such as the one using an infrared ray. In this case, the moving object 602 may be a still object. By using an infrared sensor and the like, one's eyesight can be reinforced such that he can easily recognize the presence of the moving object 602 even in the night.

Embodiment 1

In this embodiment, specific configuration of on optical system used in the goggle display device of the invention is described.

Figure 7:
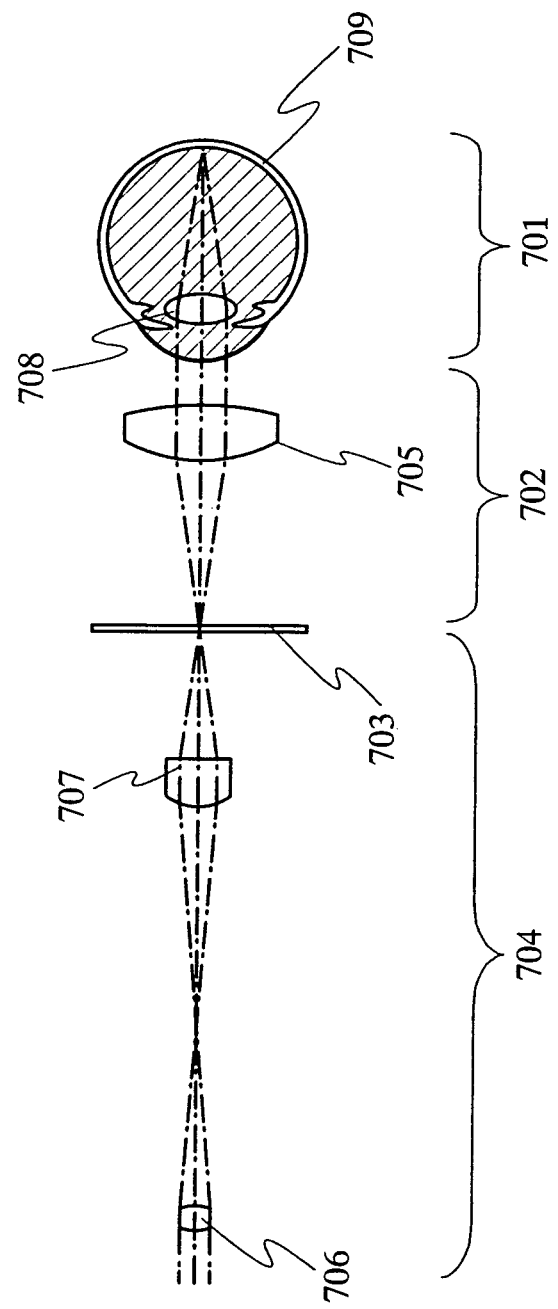
FIG. 7 illustrates a positional relationship between an optical system, a panel, and an eyeball.

An optical system used in the goggle display device of the invention is classified into a first optical system provided between a panel and an eyeball of a user, and a second optical system provided across the panel from the eyeball. FIG. 7 shows a positional relationship between an eyeball 701 of a user, a first optical system 702, a panel 703, and a second optical system 704 in the direction of a visual axis.

In FIG. 7, a convex lens 705 is used as the first optical system 702. In addition, two convex lenses 706 and 707 are used as the second optical system 704. The outside light entering the convex lens 706 passes through the convex lens 707, the panel 703, and the convex lens 705 in this order, and finally enters the eyeball 701. The convex lens 706 is focused on a point between the convex lens 706 and the convex lens 707 while the convex lens 707 is focused on the panel 703. The light entering a crystal lens 708 of the eyeball 701 from the convex lens 705 is desirably brought into focus on a retina 709 of the eyeball 701.

By bringing the outside light into focus on the panel 703 in this manner, the outside light and the light emitted from the panel 703 can both be brought into focus on the retina 709. Accordingly, a user can clearly recognize the surrounding scenery and an image displayed on the panel at the same time.

It should be noted that an optical system is not necessarily provided according to the invention. Alternatively, only the first optical system 702 may be used in order to give priority to the clarity of an image displayed on the panel 703 over the clarity of the surrounding scenery.

Embodiment 2

In this embodiment, one embodiment of the telecommunication system of the invention is described specifically.

In the case where the goggle display device of the invention has a means for detecting the direction in which the goggle display device faces, the directional information of the goggle display device itself can be obtained in addition to the positional information thereof. When the positional information and the directional information of the goggle display device are utilized in order to specify an area that is located in the direction in which the goggle display device faces, and check it with a database, information on the area such as the one on buildings within the area, the address of the area, and the like can be obtained.

Figure 8A:
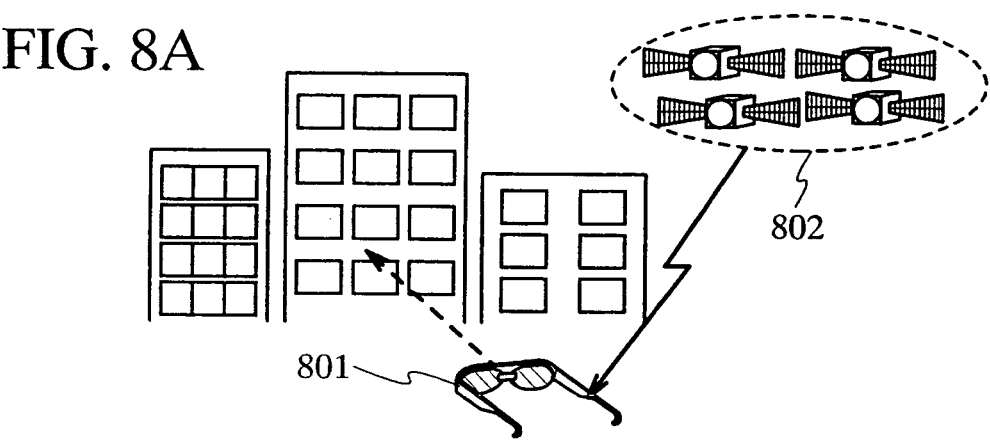
FIGS. 8A to 8C each illustrates an embodiment of the telecommunication system of the invention.

It is assumed that a goggle display device 801 faces a certain direction at a specific point as shown in FIG. 8A. The goggle display device 801 calculates the positional information of the point such as the latitude and the longitude by using a GPS signal from a GPS satellite 802. The goggle display device 801 specifies the direction in which it faces by using a direction sensor typified by a compass, gyrocompass, and the like.

Figure 8B:
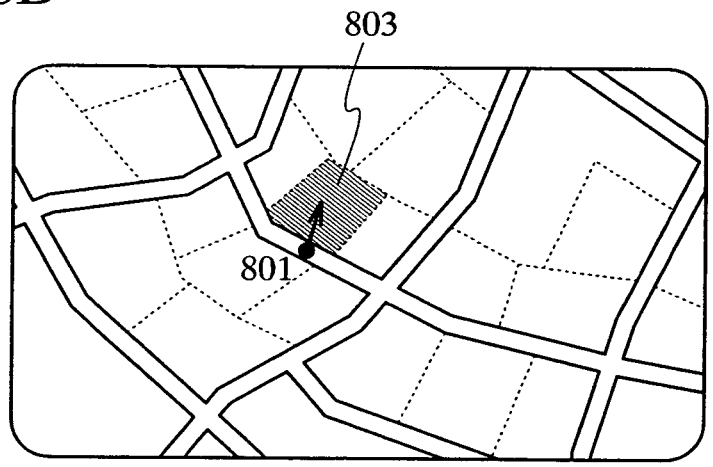

The goggle display device 801 specifies an area that is located in the direction in which the goggle display device 801 faces by using the positional information and the directional information of the goggle display device itself. FIG. 8B schematically shows the position of the goggle display device 801 and an area 803 that is located in the direction in which the goggle display device faces.

Figure 8C:
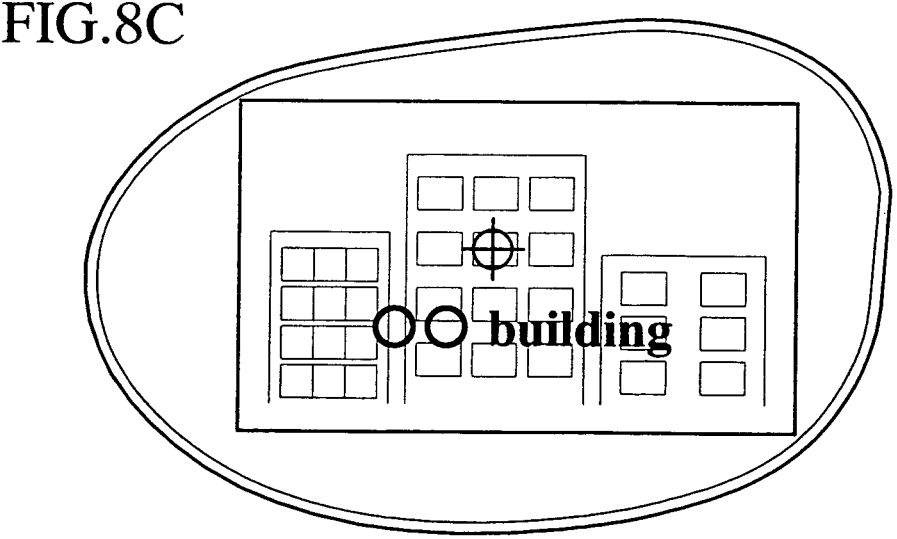

The goggle display device 801 transmits/receives signals to/from a wireless base station through a telecommunication satellite, an antenna, and the like, and pulls up the information on the area from a database, so that it can display the information on a light emitting device as shown in FIG. 8C. At this time, a user can see both the information on the area and the area that are superimposed, therefore, it is possible for him to check the area or an object that is present in the area with the information on the area easily.

It should be noted that the goggle display device 801 specifies an area that is located in the direction in which the goggle display device 801 faces in this embodiment, however, the invention is not limited to this structure. For example, it is possible that the positional information and the directional information of the goggle display device 801 are transmitted to the wireless base station, whereby these two pieces of information are checked with the information stored in the database in order to specify the area.

Embodiment 3

In this embodiment, more specific configuration of a light emitting device that is used in the goggle display device of the invention is described.

Figure 9:
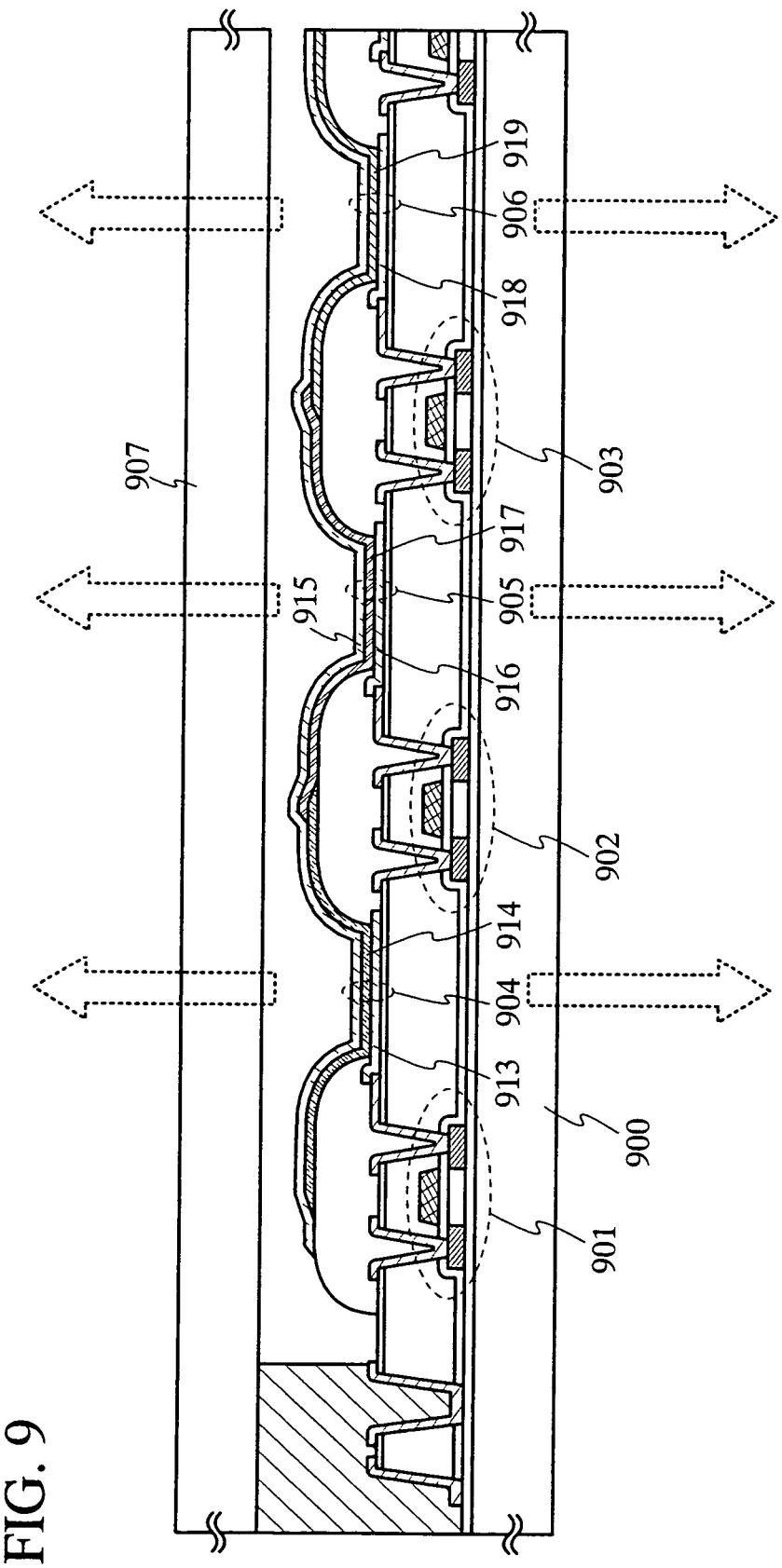
FIG. 9 illustrates a cross sectional diagram of a pixel included in a light emitting device.

FIG. 9 shows one mode of a cross sectional view of a pixel in the light emitting device of the invention. In FIG. 9, TFTs 901 to 903 and light emitting elements 904 to 906 are formed over a substrate 900. The TFT 901 controls a current supply to the light emitting element 904. The TFT 902 controls a current supply to the light emitting element 905. Similarly, the TFT 903 controls a current supply to the light emitting element 906.

Reference numeral 907 denotes a light transmissive covering material for sealing the light emitting elements 904 to 906. The covering material 907 may be provided with a color filter.

The light emitting element 904 includes an anode 913 electrically connected to the TFT 901, an electroluminescent layer 914 formed on the anode 913, and a cathode 915 formed on the electroluminescent layer 914. The overlapped portion of the anode 913, the electroluminescent layer 914, and the cathode 915 corresponds to the light emitting element 904.

The light emitting element 905 includes an anode 916 electrically connected to the TFT 902, an electroluminescent layer 917 formed on the anode 916, and the cathode 915 formed on the electroluminescent layer 917. The overlapped portion of the anode 916, the electroluminescent layer 917, and the cathode 915 corresponds to the light emitting element 905.

The light emitting element 906 includes an anode 918 electrically connected to the TFT 903, an electroluminescent layer 919 formed on the anode 918, and the cathode 915 formed on the electroluminescent layer 919. The overlapped portion of the anode 918, the electroluminescent layer 919, and the cathode 915 corresponds to the light emitting element 906.

It should be noted that the electroluminescent layers 914, 917 and 919 that are different in contained electroluminescent material or element structure are used for pixels corresponding to each color in FIG. 9, however, the invention is not limited to this. It is only required that electroluminescent layers that are different in contained electroluminescent material or element structure are used at least in the pixels corresponding to two colors.

According to the invention, the anodes 913, 916 and 918 and the cathode 915 transmit light. Light from the light emitting elements 904, 905 and 906 can be emitted to the sides of the anodes 913, 916 and 918 and the cathode 915.

It should be noted that the anode is formed closer to the substrate 900 than the cathode in FIG. 9, however, the invention is not limited to this. Alternatively, the cathode may be formed closer to the substrate 900 than the anode. In this case, however, the cathode is separately formed for each pixel whereas the anode is used in common.

In this embodiment, a top gate TFT is used as the TFT for supplying a current to the light emitting element, however, a bottom gate transistor may be used as well. In addition, a polycrystalline semiconductor, a microcrystalline semiconductor (semi-amorphous semiconductor), an amorphous semiconductor, and the like may be used as the TFT.

Embodiment 4

Figure 10A:
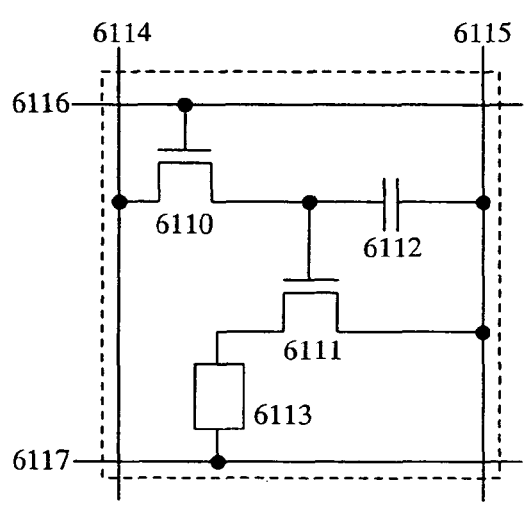
FIGS. 10A to 10C each illustrates a circuit diagram of a pixel included in a light emitting device.
Figure 10B:
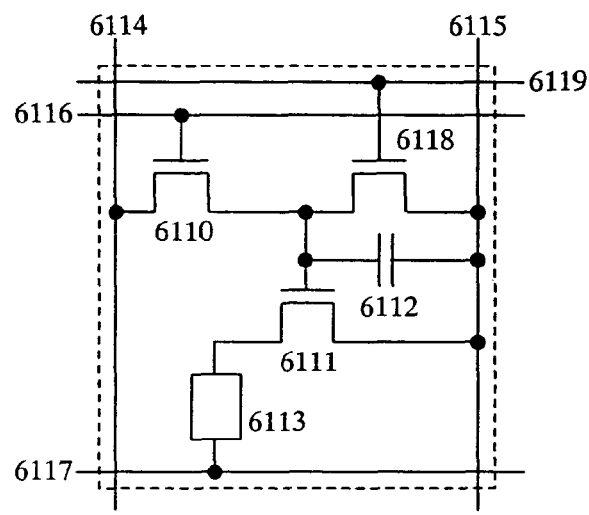
Figure 10C:
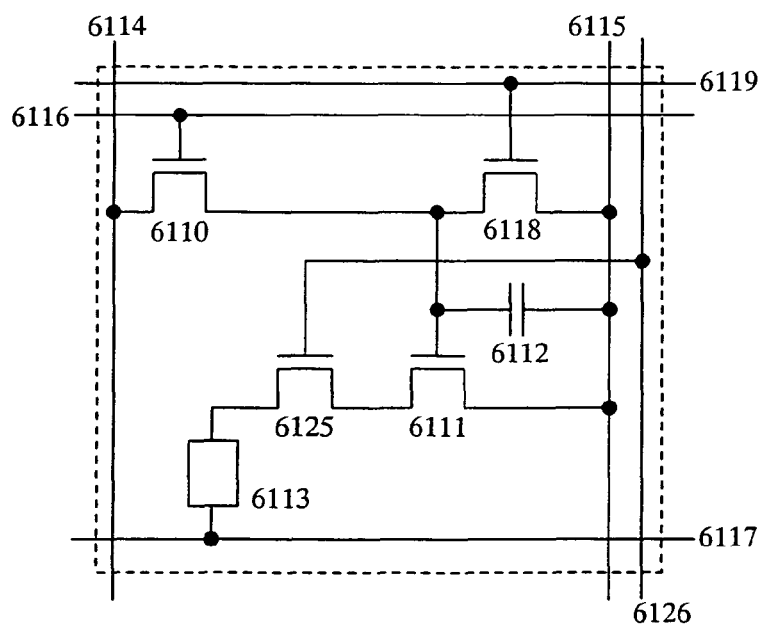

FIGS. 10A to 10C each shows a circuit diagram of a pixel of a light emitting device used in the goggle display device of the invention. FIG. 10A shows an equivalent circuit diagram of a pixel including a signal line 6114, power supply lines 6115 and 6117, a scan line 6116, a light emitting element 6113, a TFT 6110 for controlling an input of a video signal to the pixel, a TFT 6111 for controlling a current value flowing between both electrodes of the light emitting element 6113, and a capacitor 6112 for holding the gate-source voltage of the TFT 6111. It should be noted that FIG. 10A shows the capacitor 6112, however, it may not be provided in the case where it can be substituted by the gate capacitance of the TFT 6111 or other parasitic capacitance.

FIG. 10B shows the pixel circuit shown in FIG. 10A, which is additionally disposed with a TFT 6118 and a scan line 6119. The TFT 6118 enables to obtain a state in which no current flows into the light emitting element 6113, therefore, a lighting period can start concurrently with or immediately after a writing period without awaiting the completion of signal writing to all the pixels. Accordingly, a duty ratio can be enhanced, and moving images in particular can be displayed favorably.

FIG. 10C shows the pixel circuit shown in FIG. 10B, which is additionally disposed with a TFT 6125 and a wiring 6126.

According to the configuration, the gate electrode of the TFT 6125 is connected to the wiring 6126 that is held at a constant potential, thereby fixing the potential at the gate electrode so that the TFT 6125 operates in a saturation region. The gate electrode of the TFT 6111 that is connected in series to the TFT 6125 and operates in a linear region is inputted with a video signal that transmits information on the emission or non-emission of the pixel through the TFT 6110. The source-drain voltage of the TFT 6111 that operates in a linear region has a small value, therefore, a slight change in the gate-source voltage of the TFT 6111 does not have effects on the current value flowing into the light emitting element 6113. Accordingly, the current value flowing into the light emitting element 6113 is determined by the TFT 6125 that operates in a saturation region. According to the invention having the aforementioned configuration, image quality can be enhanced by improving luminance variations of the light emitting element 6113 derived from the characteristic variations of the TFT 6125. It should be noted that a channel length $L_1$ and a channel width $W_1$ of the TFT 6125, and a channel length $L_1$ and a channel width $W_2$ of the TFT 6111 desirably satisfy the relation: $L_1/W_1:L_2/W_2$=5 to 6000:1. In addition, each of the TFTs is desirably of the same conductivity type in view of the manufacturing process. Further, the TFT 6125 may be a depletion mode TFT as well as an enhancement mode TFT.

A light emitting device formed by using the invention may employ either of an analog video signal and a digital video signal. A voltage applied to a light emitting element may be constant or a current flowing into the light emitting element may be constant. The former one in which a voltage applied to a light emitting element is constant is referred to as a constant voltage drive while the latter one in which a current flowing into the light emitting element is constant is referred to as a constant current drive. According to the constant current drive, a constant current flows independently of the changes in resistance of a light emitting element. This embodiment can be freely implemented in combination with the aforementioned embodiment mode and embodiments.

Embodiment 5

Figure 11A:
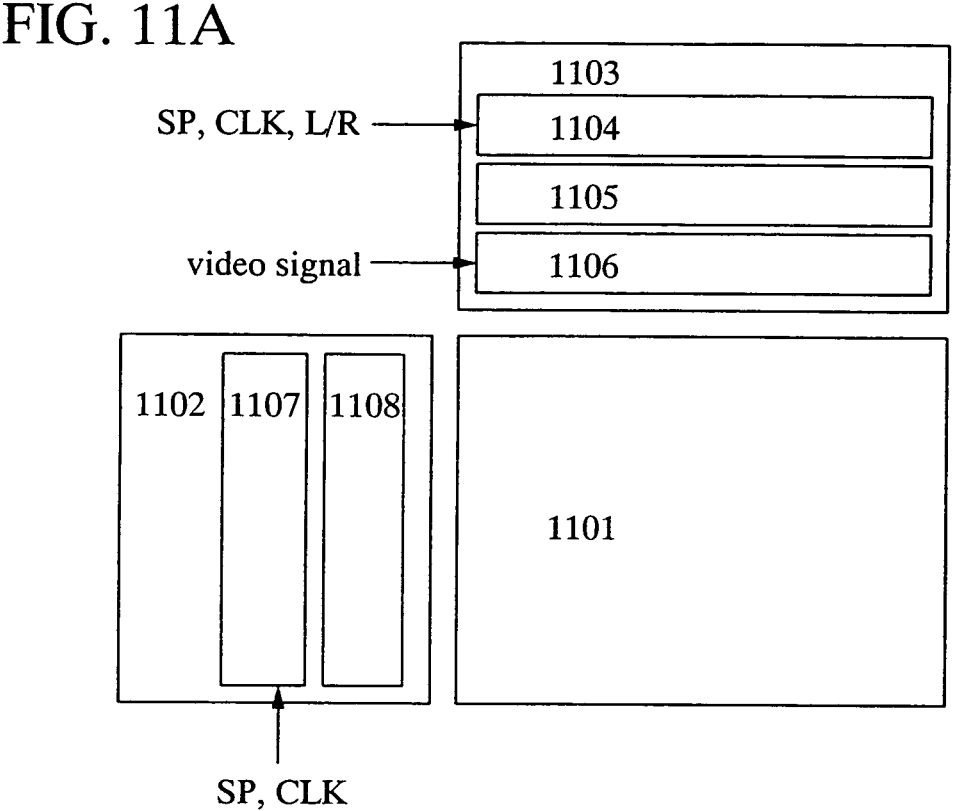
FIGS. 11A and 11B each illustrates a block diagram of a light emitting device.

In this embodiment, driver circuits of a light emitting device used in the goggle display device of the invention are described. FIG. 11A shows a block diagram of a light emitting device of this embodiment. The light emitting device shown in FIG. 11A includes a pixel portion 1101 in which a plurality of pixels each provided with a light emitting element are disposed, a scan line driver circuit 1102 for selecting each pixel, and a signal line driver circuit 1103 for controlling an input of a video signal to the selected pixel.

In FIG. 11A, the signal line driver circuit 1103 includes a shift register 1104, a level shifter 1105, and a buffer 1106. A clock signal (CLK), a start pulse signal (SP), and a switch signal (L/R) are inputted to the shift register 1104. When the clock signal (CLK) and the start pulse signal (SP) are inputted to the shift register 1104, a timing signal is generated therein, which is then inputted to the level shifter 1105. The order in which pulses of the timing signal appear is switched according to the switch signal (L/R).

The timing signal is modulated in its pulse level in the level shifter 1105, and then inputted to the buffer 1106. In the buffer 1106, a video signal is sampled in synchronization with the pulse of the inputted timing signal, and then it is inputted to the pixel portion 1101 through a signal line.

Now, configuration of the scan line driver circuit 1102 is described. The scan line driver circuit 1102 includes a shift register 1107 and a buffer 1108. It may include a level shifter if necessary. When a clock signal CLK and a start pulse signal SP are inputted to the shift register 1107 of the scan line driver circuit 1102, a selection signal is generated. The generated selection signal is buffer amplified in the buffer 1108, and then supplied to a corresponding scan line. The scan line is connected to gates of transistors of one line of pixels. Since transistors of one line of pixels are required to be turned ON at once, the buffer 1108 is required to be capable of flowing a large current.

It should be noted that instead of the shift registers 1104 and 1107, an alternative circuit capable of selecting a signal line such as a decoder circuit may be used.

Figure 11B:
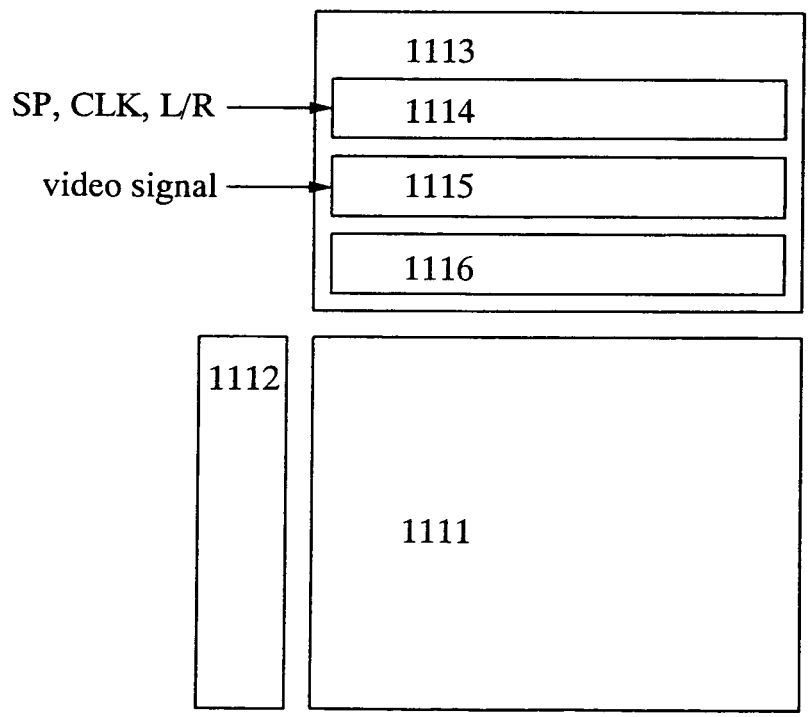

FIG. 11B shows a block diagram of a light emitting device of this embodiment, which is different from FIG. 11A. The light emitting device shown in FIG. 11B includes a pixel portion 1111 in which a plurality of pixels each provided with a light emitting element are disposed, a scan line driver circuit 1112 for selecting each pixel, and a signal line driver circuit 1113 for controlling an input of a video signal to the selected pixel.

In FIG. 11B, the signal line driver circuit 1113 includes a shift register 1114, a latch A1115, and a latch B1116. A clock signal (CLK), a start pulse signal (SP), and a switch signal (L/R) are inputted to the shift register 1114. When the clock signal (CLK) and the start pulse signal (SP) are inputted to the shift register 1114, a timing signal is generated therein. The order in which pulses of the timing signal appear is switched according to the switch signal (L/R). The generated timing signal is inputted to the latch A1115 on the first stage in sequence. When the timing signal is inputted to the latch A1115, a video signal is written to and held in the latch A1115 in sequence in synchronization with the pulse of the timing signal. It should be noted that a video signal is inputted to the latch A1115 in sequence in this embodiment, however, the invention is not limited to this. It is also possible that the latch A1115 having a plurality of stages is divided into several groups, and a video signal is inputted to each group in parallel, namely a division drive is performed. It should be noted that the number of groups for this case is called the number of division. In the case of dividing the latch into four groups for example, the division drive is carried out with four divided groups.

A period through which video signal writings to all the stages of the latch A1115 are completed is referred to as a line period. The line period in practice may include a horizontal fry-back period in addition to the line period.

When one line period is completed, a latch signal is supplied to the latch B1116 on the second stage, and video signals held in the latch A1115 are written to and held in the latch B1116 all at once in synchronization with the latch signal. The latch A1115 that has transferred the video signals to the latch B1116 is once again written with a next video signal in sequence in synchronization with the timing signal from the shift register 1114. During this second line period, the video signal that is written to and held in the latch B1116 is inputted to the pixel portion 1111 through a signal line.

It should be noted that instead of the shift register 1114, an alternative circuit capable of selecting a signal line such as a decoder circuit may be used.

Embodiment 6

In this embodiment, one embodiment of a connecting method of a light emitting device and an IC is described.

Figure 12A:
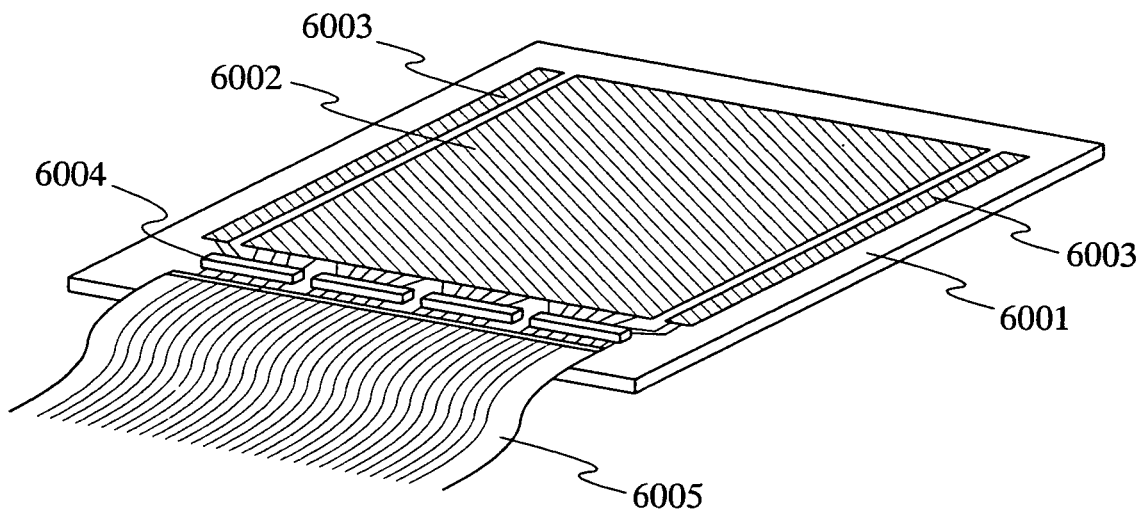
FIGS. 12A and 12B each illustrates an oblique perspective view of a panel mounting an IC chip.
Figure 12B:
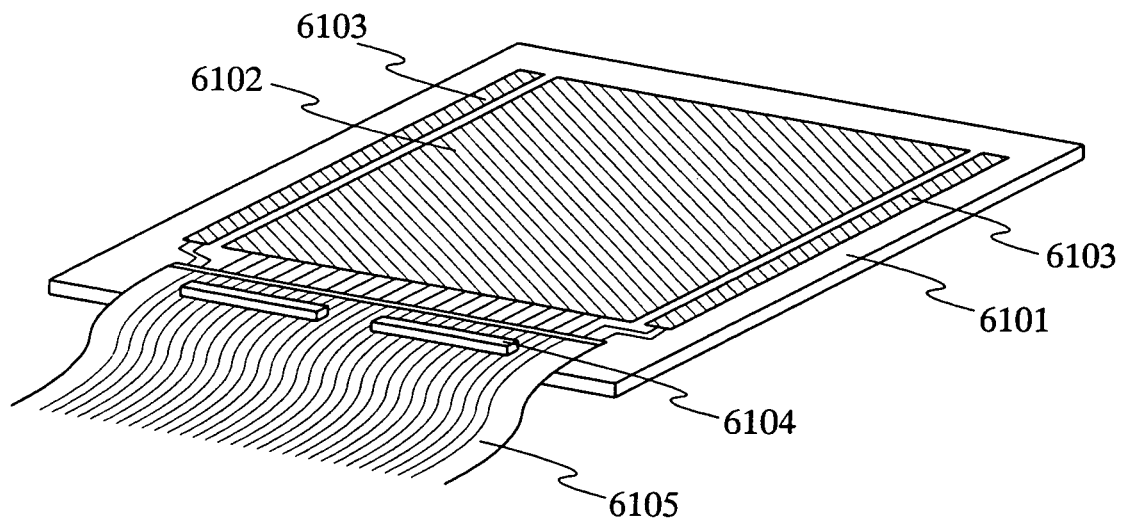

FIGS. 12A and 12B each shows a view in which an IC in a chip form (IC chip) is mounted on a substrate formed with a pixel portion. In FIG. 12A, a pixel portion 6002 and a scan line driver circuit 6003 are formed over a substrate 6001. A signal line driver circuit formed by using an IC chip 6004 is mounted on the substrate 6001. Specifically, the signal line driver circuit formed by using the IC chip 6004 is attached to the substrate 6001, and electrically connected to the pixel portion 6002. Reference numeral 6005 denotes an FPC, through which power supply potentials, various signals, and the like are supplied to the pixel portion 6002, the scan line driver circuit 6003, and the signal line driver circuit formed by using the IC chip 6004.

In FIG. 12B, a pixel portion 6102 and a scan line driver circuit 6103 are formed over a substrate 6101. A signal line driver circuit formed by using an IC chip 6104 is mounted on an FPC 6105 that is mounted on the substrate 6101. Power supply potentials, various signals, and the like are supplied through the FPC 6105 to the pixel portion 6102, the scan line driver circuit 6103, and the signal line driver circuit formed by using the IC chip 6104.

The mounting method of the IC chip is not particularly limited. Any known method such as COG method, wire bonding, and TAB can be used. The mounting position of the IC chip is not limited to the one shown in FIG. 12A or 12B as long as an electrical connection is enabled. In FIGS. 12A and 12B, only the signal line driver circuit is formed by using an IC chip, however, the scan line driver circuit may be formed by using an IC chip, or alternatively, a controller, a CPU, a memory, and the like may be formed by using an IC chip to be mounted. In addition, not the whole the signal line driver circuit or scan line driver circuit, but a part thereof may be formed by using an IC chip.

It should be noted that in a light emitting device that is mounted with a driver circuit as an IC chip, a transistor used in a pixel portion is not limited to a TFT formed of an amorphous semiconductor film such as amorphous silicon. It may be a TFT formed of a microcrystalline semiconductor film or a polycrystalline semiconductor film. It may also be a transistor formed by using single crystalline silicon or a transistor using an SOI. Alternatively, a transistor using an organic semiconductor or a carbon nanotube may be used. By separately forming an integrated circuit such as a driver circuit by using an IC chip to be mounted, the yield can be increased as compared to the case of forming all the circuits and a pixel portion on a common substrate, which enables the process optimization to be carried out easily in accordance with the characteristics of each circuit.

What is claimed is:

1. A display device comprising:
    a first optical system comprising a first convex lens;
    a second optical system comprising a second convex lens and a third convex lens;
    a light emitting device including a pixel portion including a plurality of pixels and an associated controller, the plurality of pixels comprising a pixel comprising:
        a first transistor;
        a second transistor;
        a third transistor;
        a fourth transistor;
        a capacitor; and
        a light emitting element,
    wherein a first terminal of the first transistor is connected to a first signal line,
    wherein a second terminal of the first transistor is connected to a first terminal of the second transistor, a first terminal of the capacitor, and a gate of the third transistor,
    wherein a second terminal of the second transistor, a second terminal of the capacitor, and a second terminal of the third transistor are connected to a second signal line in a direction parallel to the first signal line, wherein a gate of the fourth transistor is connected to a third signal line in the direction parallel to the first signal line, wherein a first electrode of the light emitting element is connected to a fourth signal line in a direction perpendicular to the first signal line, wherein a second electrode of the light emitting element is connected to a first terminal of the fourth transistor, wherein a second terminal of the fourth transistor is connected to a first terminal of the third transistor, wherein a gate of the first transistor is connected to a fifth signal line in a direction parallel to the fourth signal line, where a gate of the second transistor is connected to a sixth signal line in the direction parallel to the fourth signal line, and wherein a ratio of a channel length to a channel width of the fourth transistor is 5 or more; and a supporting portion configured to permit a user to wear the light emitting device, wherein the light emitting element includes an electroluminescent layer interposed between the first electrode and the second electrode, wherein each of the first electrode and the second electrode transmits light, wherein an outside light is focused on the light emitting device by the third convex lens and the second convex lens, wherein the supporting portion is configured to fix the light emitting device at a position at which a user's visual axis can cross the pixel portion so that the outside light of an outside area, which is incident on a first side of the light emitting device, transmits through the first electrode and the second electrode to a second side of the light emitting device and is transmitted along with information about the outside area, which is provided at the second side of the light emitting device, to be received by the user's eyes through the first convex lens while the electroluminescent layer emits light, wherein the display device is configured to permit the outside area to be viewed by the user through the first electrode and the second electrode, wherein the associated controller is configured to cause the information about the outside area to be displayed by the light emitting device and to vary the information based on a direction in which the light emitting device faces, and wherein the light emitting device which displays the information about the outside area is located on the user's visual axis when the user's visual axis is directed toward the outside area.

2. A display device comprising:
a light emitting device including a pixel portion including a plurality of pixels and an associated controller, the plurality of pixels comprising a pixel comprising:
a first transistor;
a second transistor;
a third transistor;
a fourth transistor;
a capacitor; and
a light emitting element,
wherein a first terminal of the first transistor is connected to a first signal line, wherein a second terminal of the first transistor is connected to a first terminal of the second transistor, a first terminal of the capacitor, and a gate of the third transistor, wherein a second terminal of the second transistor, a second terminal of the capacitor, and a second terminal of the third transistor are connected to a second signal line in a direction parallel to the first signal line, wherein a gate of the fourth transistor is connected to a third signal line in the direction parallel to the first signal line, wherein a first electrode of the light emitting element is connected to a fourth signal line in a direction perpendicular to the first signal line, wherein a second electrode of the light emitting element is connected to a first terminal of the fourth transistor, wherein a second terminal of the fourth transistor is connected to a first terminal of the third transistor, wherein a gate of the first transistor is connected to a fifth signal line in a direction parallel to the fourth signal line, where a gate of the second transistor is connected to a sixth signal line in the direction parallel to the fourth signal line, and wherein a ratio of a channel length to a channel width of the fourth transistor is 5 or more;

a supporting portion configured to permit a user to wear the light emitting device;

an antenna for transmitting/receiving signals;

a receiver circuit for processing GPS signals that are transmitted from a GPS satellite; and an arithmetic circuit for calculating positional information by using the GPS signals, wherein the light emitting element includes an electroluminescent layer interposed between the first electrode and the second electrode, wherein each of the first electrode and the second electrode transmits light, wherein the supporting portion is configured to fix the light emitting device at a position at which a user's visual axis can cross the pixel portion so that an outside light of an outside area, which is incident on a first side of the light emitting device, transmits through the first electrode and the second electrode to a second side of the light emitting device and is transmitted along with information about the outside area, which is provided at the second side of the light emitting device, to be received by the user's eyes while the electroluminescent layer emits light, wherein the display device is configured to permit the outside area to be viewed by the user through the first electrode and the second electrode, wherein the associated controller is configured to cause the information about the outside area to be displayed by the light emitting device and to vary the information based on a direction in which the light emitting device faces, and wherein the light emitting device which displays the information about the outside area is located on the user's visual axis when the user's visual axis is directed toward the outside area.

3. A display device comprising:
a light emitting device including a pixel portion including a plurality of pixels and an associated controller, the plurality of pixels comprising a pixel comprising:
a first transistor;
a second transistor;
a third transistor;
a fourth transistor;

a capacitor; and
a light emitting element,
wherein a first terminal of the first transistor is connected to a first signal line,
wherein a second terminal of the first transistor is connected to a first terminal of the second transistor, a first terminal of the capacitor, and a gate of the third transistor,
wherein a second terminal of the second transistor, a second terminal of the capacitor, and a second terminal of the third transistor are connected to a second signal line in a direction parallel to the first signal line,
wherein a gate of the fourth transistor is connected to a third signal line in the direction parallel to the first signal line,
wherein a first electrode of the light emitting element is connected to a fourth signal line in a direction perpendicular to the first signal line,
wherein a second electrode of the light emitting element is connected to a first terminal of the fourth transistor,
wherein a second terminal of the fourth transistor is connected to a first terminal of the third transistor,
wherein a gate of the first transistor is connected to a fifth signal line in a direction parallel to the fourth signal line,
where a gate of the second transistor is connected to a sixth signal line in the direction parallel to the fourth signal line, and
wherein a ratio of a channel length to a channel width of the fourth transistor is 5 or more; and
a supporting portion configured to permit a user to wear the light emitting device,
wherein the light emitting element includes an electroluminescent layer interposed between the first electrode and the second electrode,
wherein each of the first electrode and the second electrode transmits light,
wherein the supporting portion is configured to fix the light emitting device at a position at which a user's visual axis can cross the pixel portion so that an outside light of an outside area, which is incident on a first side of the light emitting device, transmits through the first electrode and the second electrode to a second side of the light emitting device and is transmitted along with information about the outside area, which is provided at the second side of the light emitting device, to be received by the user's eyes while the electroluminescent layer emits light, and
wherein the display device is configured to permit the outside area to be viewed by the user through the first electrode and the second electrode.

4. The display device according to claim 2, wherein the positional information comprises a latitude and a longitude.

5. The display device according to claim 2 further comprising a memory for storing a processed GPS signal and the positional information as data.

6. The display device according to claim 3 further comprising a memory for storing a processed GPS signal and a positional information as data.

7. The display device according to claim 1, wherein the light emitting device is interposed between the first optical system and the second optical system.

8. The display device according to claim 2, further comprising:
a first optical system comprising a first convex lens; and
a second optical system comprising a second convex lens and a third convex lens,
wherein the outside light is focused on the light emitting device through the third convex lens and the second convex lens, and
wherein the outside light is received by the user's eyes through the first convex lens while the electroluminescent layer emits light.

9. The display device according to claim 3, further comprising:
a first optical system comprising a first convex lens; and
a second optical system comprising a second convex lens and a third convex lens,
wherein the outside light is focused on the light emitting device through the third convex lens and the second convex lens, and
wherein the outside light is received by the user's eyes through the first convex lens while the electroluminescent layer emits light.

10. The display device according to claim 2, wherein the outside light reaches the display device directly, without going through an optical system.

11. The display device according to claim 3, wherein the outside light reaches the display device directly, without going through an optical system.

12. The display device according to claim 1, wherein the first transistor, the second transistor, the third transistor, and the fourth transistor have a same conductivity type.

13. The display device according to claim 2, wherein the first transistor, the second transistor, the third transistor, and the fourth transistor have a same conductivity type.

14. The display device according to claim 3, wherein the first transistor, the second transistor, the third transistor, and the fourth transistor have a same conductivity type.

15. The display device according to claim 1, wherein a ratio of a channel length to a channel width of the third transistor is 5 or more.

16. The display device according to claim 2, wherein a ratio of a channel length to a channel width of the third transistor is 5 or more.

17. The display device according to claim 3, wherein a ratio of a channel length to a channel width of the third transistor is 5 or more.

* * * * *